E. K. BAKER.
PNEUMATIC TIRE.
APPLICATION FILED JAN. 26, 1914.

1,261,754.

Patented Apr. 9, 1918.
2 SHEETS—SHEET 1.

E. K. BAKER.
PNEUMATIC TIRE.
APPLICATION FILED JAN. 26, 1914.
1,261,754.
Patented Apr. 9, 1918.
2 SHEETS—SHEET 2.
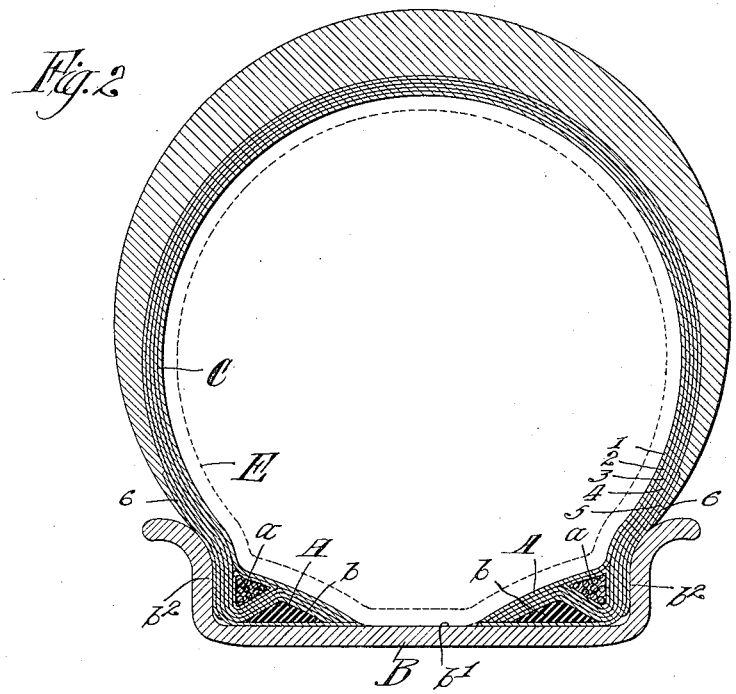
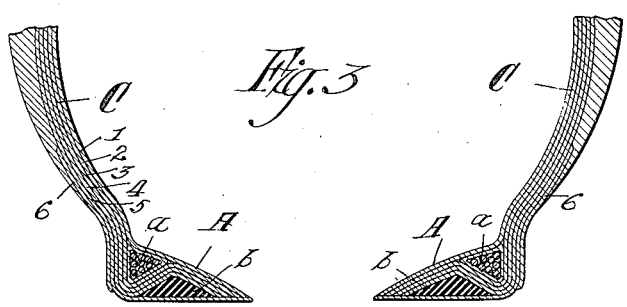
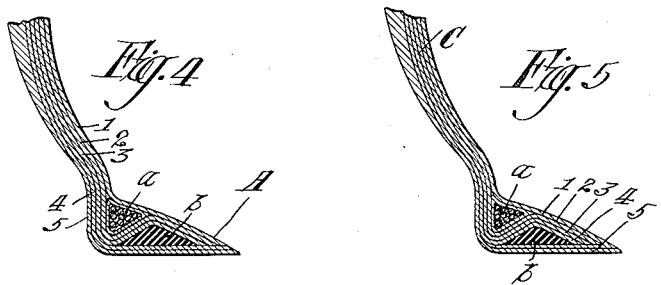
Witnesses:
Inventor:
Erle K. Baker.

UNITED STATES PATENT OFFICE.

ERLE K. BAKER, OF CHICAGO, ILLINOIS, ASSIGNOR, BY MESNE ASSIGNMENTS, TO HIMSELF AND CHARLES GILBERT HAWLEY, OF CHICAGO, ILLINOIS.

PNEUMATIC TIRE.

1,261,754.  Specification of Letters Patent.  Patented Apr. 9, 1918.

Application filed January 26, 1914. Serial No. 314,513.

*To all whom it may concern:*

Be it known that I, ERLE K. BAKER, a citizen of the United States, and a resident of Chicago, county of Cook, and State of Illinois, have invented certain new and useful Improvements in Pneumatic Tires, of which the following is a specification.

My invention relates to improvements in pneumatic tires and has particular reference to improvements in pneumatic tire casings.

The object of my invention is to simplify the construction, reduce the weight and cost, and increase the strength and durability of pneumatic tire casings.

A further object of my invention is to simplify and improve the construction of the base flanges of straight side, *i. e.*, non-clencher pneumatic tire casings to the end that while the labor and material cost shall be reduced, their strength and durability shall be increased, the grip of the casing upon the rim assured, and the retention of the casing upon the rim made certain.

A further object of my invention is to provide a straight-side, *i. e.*, non-clencher pneumatic tire casing with base flanges which shall be positively retained upon the tire rim; which base flanges shall be composed of a minimum quantity of material, which shall have great strength to withstand the wear and tear of actual use, and which shall be so formed that while the base flanges are prevented from escaping from the containing rim, the inner or toe-portions are sufficiently flexible or compressible that they shall be pressed by the air within the tire, into close, firm and gripping contact with the containing rim.

My invention resides in a pneumatic tire casing having V-shaped base flanges, the flanges having reinforcing non-expansible rings in their outer or thicker parts, and their inner, thinner or toe-portions being slightly compressible whereby the pressure within the tire causes the flanges to hug the rim very tightly.

My invention also consists in a tire casing having V-shaped or inwardly tapered base flanges provided with inexpansible, flexible metal rings in their outer or thicker parts, and slightly compressible relatively hard filler rings in their thinner or toe-portions.

My invention also consists in a straight-side, *i. e.*, non-clencher type pneumatic tire casing having inwardly extending, inwardly tapering base flanges the flanges being provided with coöperating triangular retaining rings and ring fillers.

My invention will be more readily understood by reference to the accompanying drawings forming part of this specification, and in which:

Fig. 2 is an enlarged cross sectional view of the casing and rim;

Fig. 3 is a view of the base portion of the casing like that shown in Fig. 2, but free of the rim;

Fig. 4 is a sectional view of one base flange of a tire casing, showing a slightly modified structure; and Fig. 5 is a similar section showing another modification of my invention.

Figure 1:
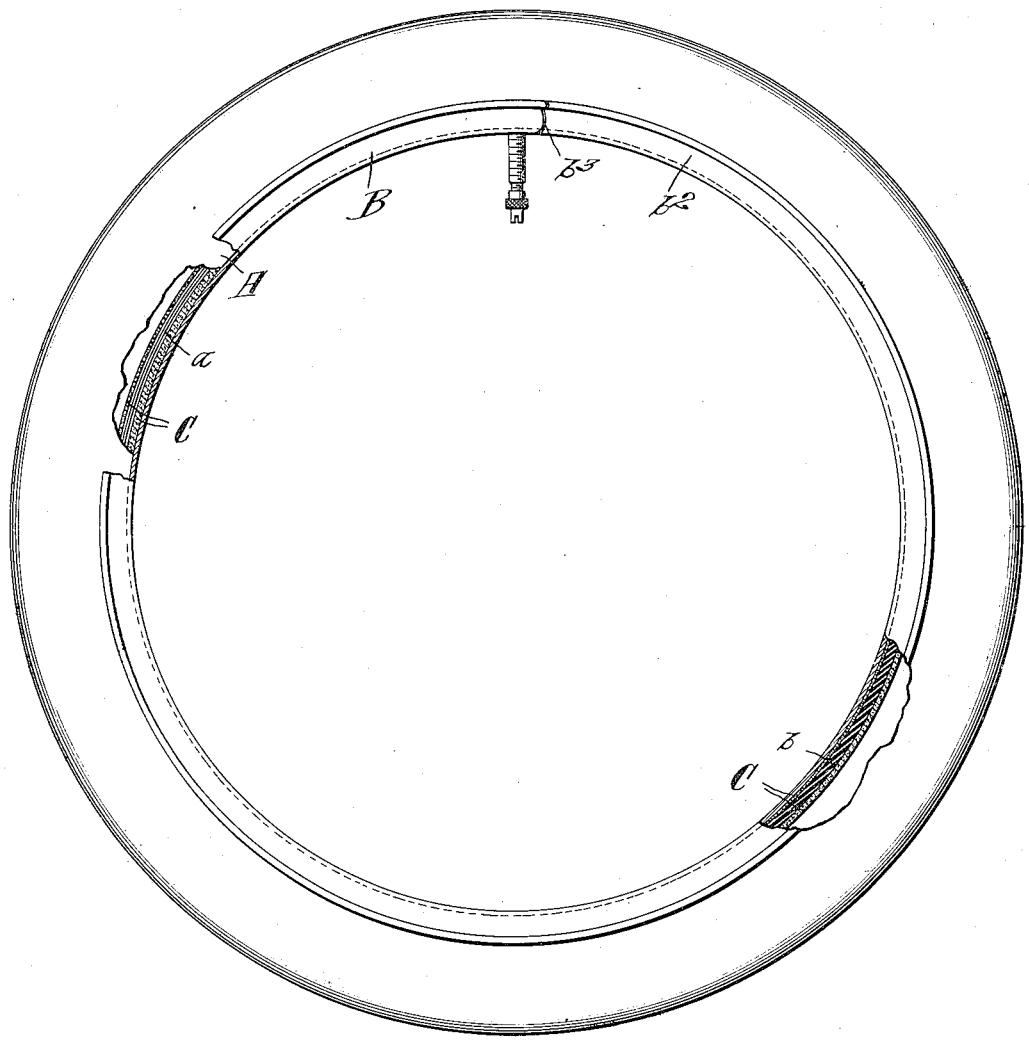
Figure 1 is a side elevation of a pneumatic tire and its containing rim, the tire and rim being partly broken away to show the construction of the casing.

The portion of the tire or casing which is of the largest diameter is the tread or wearing portion, and the portions of least diameter are the base portions. These portions are relatively thick and are joined together by the relatively thin side portions. The base portions fit a suitable rim, as shown in Figs. 1 and 2.

I make the base portion of the tire in the form of two oppositely disposed V-shaped or inwardly tapered base flanges or foot portions A, which fit within the tire rim B, and are held in position therein by means of the pressure within the tire. Within each base flange or bead I embed or secure a flexible endless metal ring *a* and a relatively rigid filler *b*, the latter preferably made of semi-hard or partly vulcanized rubber. The body of the casing C is made up of several layers of fabric, preferably 5, as shown, and which preferably extend from the inner edge of one of the base bead flanges around the casing and terminate at the inner edge of the opposite flange.

The ring and the filler are embedded in, joined together, and unified by the several layers of fabric and the rubber which they contain, in a manner to produce a practically indestructible base flange of light weight and great strength. These base flanges thus provide the casing with V-shaped or tapered edges or foot portions which fit within the tire rim and by which the tire is retained in position upon the rim.

The rim B, as shown, has a substantially flat or middle portion $b^1$, bordered by integral vertical flanges $b^2$ and the base flanges of the casing fit within the rim, one against each rim flange. The tire is completed by an inner tube E, which is air-tight, and when the tire is in position on the tire rim, as shown in Fig. 2, the pressure of the air within the tube and tire retains the base flanges pressed outwardly against the rim flanges.

The rim shown is of the integral flange type which is split at one point $b^3$ of its circumference to facilitate the mounting and dismounting of the tire, but my invention is not limited to use with an integrally flanged rim.

In order to avoid any misunderstanding or confusion of terms, I will refer to the sides of the base flanges which lie against the rim flanges as the "outer sides" and the portions which project toward each other or toward the medial plane of the tire as the "inner sides" or "toe-portions." The tread portion of the tire I will call the "upper part" and the base portion the "lower part," but these latter terms, viz., "upper" and "lower" can obviously technically be correct only when applied to a section of the rim taken at the upper side of the tire, but as this section may obviously represent a section taken at any other point it may be considered correct to use these terms in this connection.

The casing body, as has been said, is preferably composed of five layers of fabric: an inner layer 1, middle layers 2, 3, and 4, and an outer layer 5. This fabric is what is known technically as "friction cloth," that is, it is a suitable cotton fabric which has been impregnated with prepared rubber in such condition that when the formed casing is heated to the proper temperature it will be vulcanized and will unify the several layers. In building up my casing I place the inner layer 1, of the casing, in the form of a long strip and of such a width that it can be stretched and formed upon a suitable core, the edges of the strip being arranged at the inner edges of the base flanges. Previously to beginning the formation of the casing, I have prepared the metal retaining rings and the fillers of proper relative dimensions and sizes so that they can be assembled with the layers of which the casing is formed to form the base flanges. The metal rings are preferably made up of a plurality of relatively small wires wound in a cable form and having their ends spliced or connected to form an inexpansible flexible ring. The fillers are preferably, as shown, V-shaped in cross section and are formed of partly hardened or semi-vulcanized rubber in long strips suitable to be placed in position during the formation of the casing. Having placed the inner layer or course of fabric upon the core, I next place the two metallic rings in position, seating them upon the layer of fabric properly spaced from each other. I then place or wrap the middle courses of fabric 2, 3, and 4 upon the core, drawing their edge portions around under the rings, and I then force the edge portions of these layers into contact with the inner layer which has already been placed upon the core. I accomplish this latter by forcing the triangular shaped fillers into position upon the layers of fabric and immediately within the metallic rings. The cross-sectional shapes of the fillers and rings are both preferably triangular, so that when combined together, as described, the resultant base flanges will taper from their outer edges which are relatively thick and contain the metallic rings to their inner edges which are thin and contain the semi-hard fillers. In preparing the metallic rings I wrap each ring with a layer of the prepared fabric, so that when they are placed in position, and the casing is subjected to the vulcanizing process, the rubber with which the prepared fabric is impregnated will fill the interstices of the flexible rings with rubber under the influence of the pressure to which the parts are subjected together with the softening effect due to the preliminary application of heat in the vulcanizing process. As shown in the various sections, the metallic rings are preferably formed substantially triangular in cross section, the base being turned outwardly against the inner layer of fabric, one side being parallel with the outer straight side of the base of the tire which fits against the retaining flange on the tire rim, and the third side being inclined outwardly and downwardly and substantially parallel with the adjacent surface of the filler. As thus formed, the three middle layers cross over from the outer part of the casing or base bead to the inner part or face thereof between the metal ring and the filler, and then around the filler, passing downward and upward around the ring and upward and downward around the filler and thus serve to strengthen and unify the base flange. The cross sectional shape of the filler is a flat substantially isosceles triangle having its base turned downwardly forming the bottom of the flange, and having one thin edge projecting inwardly and the other outwardly. The inner edge forms the thin inner edge or toe of the flange, and the outer edge of the filler projects beneath the flexible metallic ring, and the space between the ring and filler is just sufficient to receive the three middle layers of the fabric. Having placed the two fillers in position, and thus forced the middle layers 2, 3, and 4 to their positions, the casing is completed by placing in position upon the layers thus formed the outer layer or course 5. The edge portions of this layer are brought down around the metallic rings and then straight across beneath the fillers where their extreme edges join the edges of the other layers or courses at the thin edges of the base beads, thus completely inclosing the filler. The inner diameter of the metallic ring is somewhat smaller than the extreme outer diameter of the filler and this feature, in combination with the fabric which lies between them, prevents the pressure within the tire from forcing the point of the base bead beneath the metallic ring, and thus both the filler and the ring are retained in position and the tire itself is prevented from rupture. The material, semi-vulcanized rubber, of which I preferably form the filler rings, is slightly compressible and even when the flanges are completed they are still compressible to some extent. This is an important feature of my invention, for the reason that the flanges are thus capable of being forced or pressed into firm, close contact with the containing rim by the pressure within the tire. That is, even though in the formation of the casing the flanges should be so formed relatively to the tire rim that the inner edges of the flanges do not lie in close contact with the rim, this will be cured when the tire is filled with air to working pressure, for these edges are readily compressed sufficiently to cause them to contact firmly with the surface of the rim. This firm contact of the flanges, especially their inner thin edges, serves the purpose of causing the casing to be seated upon the rim with great frictional contact as well as to prevent the working of the inner tube beneath the edges of the flanges. The casing is thus held firmly in place upon the rim, and the inner tube and casing are protected against destruction, for if the tube should work beneath the flange this would probably result in the cutting of the tube or the forcing of the base of the casing off of the rim, both of which results it is the object of my invention to absolutely prevent.

The metallic ring is preferably, as shown, somewhat smaller in diameter than the outer dimensions of the flanges $b^2$ of the rim for the function of these metallic rings is to prevent the expansion of the base edges of the tire when the tire is subjected to internal pressure, and thus prevent the escape of the casing from the rim.

In some instances I add a wearing layer No. 6 around the outer part of the base flange. This layer I preferably extend somewhat above the outer part of the flange of the rim and terminate it at the lower outer corner of the base flange. This layer is more particularly for the purpose of preventing any abrasion of the main layers of fabric of the casing.

In Fig. 4 I have illustrated a form of base flange slightly different from that so far described, that is, the middle layers 2 and 3 are passed around between the ring and the filler, and the outer layers 4 and 5 are drawn straight across the base of the flange, thus thickening the fabric beneath the filler. The form shown in Fig. 5 is also slightly variant from that shown in the preferred form in that the inner edge of the inner layer No. 1 is turned outwardly beneath the base flange before the inner edge of the outer layer No. 5 is placed in position, this resulting in thickening the fabric beneath the filler similar to thickening of the fabric illustrated in Fig. 4.

It will now be evident that whichever form my tire assumes, I have provided a casing in which the base beads have a maximum of strength combined with a minimum size and a minimum quantity of material, and as all of the material of which pneumatic tires are composed is relatively expensive it will be obvious that my casing can be produced at a minimum cost. Furthermore, it will now be clear that I have greatly reduced the labor cost of pneumatic tire casings, especially casings of the straight-side, i. e. non-clencher type.

I do not herein claim the particular form or construction of reinforcing cable shown, such being particularly claimed in my co-pending application, filed Jan. 26, 1914, Serial No. 814,517.

As many modifications of my invention will readily suggest themselves to one skilled in the art, I do not limit or confine my invention to the specific structures herein shown and described.

I claim:

1. A pneumatic tire casing of the straight-side type having inwardly extending base flanges of substantially triangular cross section of greater breadth than height and presenting flexible rim-pressure edges, in combination with an endless metal ring of substantially triangular cross section embedded in each said flange at its point of juncture with the side of the casing, and each said flange having a substantially triangular filler embedded in its inner portion, inward of and below its respective metal ring.

2. A pneumatic tire casing of the straight-side type having inwardly extending base flanges of substantially triangular cross section, of greater breadth than height and presenting flexible rim-pressure edges, in combination with an endless metal ring of inverted substantially triangular form embedded in each said flange at its point of juncture with the side of the casing, and each said flange having a substantially triangular filler vulcanized in its inner portion and presenting its base to the bottom of the flange.

3. A pneumatic tire casing of the straight-side type having a carcass composed of layers of fabric and provided with inwardly extending base flanges, each of said flanges containing a metal ring of inverted triangular cross section and a non-metallic ring of triangular cross section between which the main layers of fabric pass, the whole constituting a unitary vulcanized article.

4. A pneumatic tire casing of the straight-side type having a carcass composed of layers of fabric and provided with inwardly extending base flanges of substantially triangular form, each said flange containing a substantially triangular metal ring and a triangular non-metallic filler between which the main layers of fabric pass and whereto they are vulcanized.

In testimony whereof, I have hereunto set my hand, this 20th day of January, 1914, in the presence of two subscribing witnesses.

ERLE K. BAKER.

Witnesses:
CHARLES GILBERT HAWLEY,
EDWARD J. WILSON.